United States Patent
Hori et al.

(10) Patent No.: US 11,375,563 B2
(45) Date of Patent: Jun. 28, 2022

(54) TERMINAL APPARATUS, METHOD, AND INTEGRATED CIRCUIT

(71) Applicants: SHARP KABUSHIKI KAISHA, Sakai (JP); FG Innovation Company Limited, Tuen Mun (HK)

(72) Inventors: Takako Hori, Sakai (JP); Shohei Yamada, Sakai (JP); Hidekazu Tsuboi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/957,706

(22) PCT Filed: Dec. 27, 2018

(86) PCT No.: PCT/JP2018/048080
§ 371 (c)(1),
(2) Date: Jun. 24, 2020

(87) PCT Pub. No.: WO2019/131851
PCT Pub. Date: Jul. 4, 2019

(65) Prior Publication Data
US 2020/0367304 A1    Nov. 19, 2020

(30) Foreign Application Priority Data

Dec. 28, 2017 (JP) .............................. JP2017-253552

(51) Int. Cl.
*H04W 76/15* (2018.01)
*H04W 76/19* (2018.01)
(Continued)

(52) U.S. Cl.
CPC ........... *H04W 76/15* (2018.02); *H04W 76/19* (2018.02); *H04W 76/27* (2018.02); *H04W 92/10* (2013.01)

(58) Field of Classification Search
CPC ..... H04W 76/15; H04W 76/19; H04W 76/27; H04W 92/10; H04W 76/11; H04W 76/34; H04W 76/16
See application file for complete search history.

(56) References Cited

U.S. PATENT DOCUMENTS

2016/0183151 A1*  6/2016  Wu .................. H04W 24/02
                                                          370/332
2016/0255665 A1*  9/2016  Futaki ............. H04W 72/1284
                                                          370/329
(Continued)

FOREIGN PATENT DOCUMENTS

CL   2020001735 A1   9/2020
EP     3125640 A1    2/2017
(Continued)

OTHER PUBLICATIONS

NTT Docomo, Inc., "Work Item on New Radio (NR) Access Technology", RP-170855, 3GPP TSG RAN Meeting #75, Dubrovnik, Croatia, Mar. 6-9, 2017.
(Continued)

*Primary Examiner* — Will W Lin
(74) *Attorney, Agent, or Firm* — ScienBiziP, P.C.

(57) ABSTRACT

A terminal apparatus for communicating with one or more base station apparatuses, the terminal apparatus including: a receiver configured to receive an RRC reconfiguration message including a DRB configuration from the one or more base station apparatuses, the DRB configuration including a DRB identity and an EPS bearer identity; and a processing unit configured to associate a DRB established with the EPS identity in a case that the DRB identity is not part of a
(Continued)

current configuration of the terminal apparatus, the terminal apparatus is configured with EN-DC, and the DRB was configured for the EPS bearer identity before the RRC reconfiguration message is received.

4 Claims, 15 Drawing Sheets

(51) Int. Cl.
*H04W 76/27* (2018.01)
*H04W 92/10* (2009.01)

(56) References Cited

U.S. PATENT DOCUMENTS

| | | | | |
|---|---|---|---|---|
| 2017/0013668 | A1* | 1/2017 | Chang | H04W 76/22 |
| 2019/0342824 | A1* | 11/2019 | Futaki | H04W 72/04 |
| 2019/0342932 | A1* | 11/2019 | Futaki | H04W 28/0252 |
| 2019/0387563 | A1* | 12/2019 | Futaki | H04L 5/0032 |
| 2020/0323021 | A1 | 10/2020 | Hori et al. | |
| 2020/0366554 | A1 | 11/2020 | Hori et al. | |

FOREIGN PATENT DOCUMENTS

| | | | |
|---|---|---|---|
| EP | 3713371 | A1 | 9/2020 |
| EP | 3735090 | A1 | 11/2020 |
| EP | 3793325 | A1 | 3/2021 |

OTHER PUBLICATIONS

"3rd Generation Partnership Project; Technical Specification Group Services and System Aspects; System Architecture for the 5G System; Stage 2(Release 15)", 3GPP TS 23.501 V1.4.0 (Sep. 2017).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 12)", 3GPP TS 36.300 V12.4.0 (Dec. 2014).
"3rd Generation Partnership Project; Technical Specification Group Radio Access Network; Evolved Universal Terrestrial Radio Access (E-UTRA); Radio Resource Control (RRC); Protocol specification(Release 13)", 3GPP TS 36.331 V13.0.0 (Dec. 2015).
"3rd Generation Partnership Project; Technical Specification Group Radio Access Network; Evolved Universal Terrestrial Radio Access (E-UTRA); Packet Data Convergence Protocol (PDCP) specification(Release 14)", 3GPP TS 36.323 V14.4.0 (Sep. 2017).
"3rd Generation Partnership Project; Technical Specification Group Radio Access Network; Evolved Universal Terrestrial Radio Access (E-UTRA); Radio Link Control (RLC) protocol specification(Release 13)", 3GPP TS 36.322 V13.4.0 (Sep. 2017).
"3rd Generation Partnership Project; Technical Specification Group Radio Access Network; Evolved Universal Terrestrial Radio Access (E-UTRA); Medium Access Control (MAC) protocol specification(Release 13)", 3GPP TS 36.321 V13.0.0 (Dec. 2015).
"3rd Generation Partnership Project; Technical Specification Group Radio Access Network; Evolved Universal Terrestrial Radio Access (E-UTRA) and NR; Multi-connectivity; Stage 2(Release 15)", 3GPP TS 37.340 V1.2.0 (Oct. 2017).
"3rd Generation Partnership Project; Technical Specification Group Radio Access Network; NR; NR and NG-RAN Overall Description; Stage 2(Release 15)", 3GPP TS 38.300 V1.2.0 (Nov. 2017).
"3rd Generation Partnership Project; Technical Specification Group Radio Access Network; NR; Radio Resource Control (RRC); Protocol specification(Release 15 )", 3GPP TS 38 331 V0.1.0 (Oct. 2017).
"3rd Generation Partnership Project; Technical Specification Group Radio Access Network; NR; Packet Data Convergence Protocol (PDCP) specification(Release 15)", 3GPP TS 38.323 V1.0.0 (Sep. 2017).
"3rd Generation Partnership Project; Technical Specification Group Radio Access Network; NR; Radio Link Control (RLC) protocol specification(Release 15)", 3GPP TS 38.322 V1.0.0(Sep. 2017).
"3rd Generation Partnership Project; Technical Specification Group Radio Access Network; NR; Medium Access Control (MAC) protocol specification(Release 15)", 3GPP TS 38.321 V1.0.0 (Sep. 2017).
"3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.3.0 (Mar. 2017).
"3rd Generation Partnership Project; Technical Specification Group Services and System Aspects; Procedures for the 5G System; Stage 2(Release 15)", 3GPP TS 23.502 V1.0.0 (Sep. 2017).
"3rd Generation Partnership Project; Technical Specification Group Radio Access Network; E-UTRA and NR; Service Data Adaptation Protocol (SDAP) specification(Release 15)", 3GPP TS 37.324 V0.2.0 (Sep. 2017).
Fujitsu, "Discussion on bearer type switch in dual connectivity", R2-141220, 3GPP TSG-RAN WG2 Meeting #85bis, Valencia, Spain, Mar. 31-Apr. 4, 2014.
Ericsson, "TP for RRCConnectionReconfiguration", R2-1711967, 3GPP TSG-RAN WG2 #99bis, Prague, Czech Republic, Oct. 9-13, 2017.
Sharp, "Handling of EPS bearer identity in EN-DC", R2-1713864, 3GPP TSG-RAN WG2 Meeting #100, Reno, USA, Nov. 27-Dec. 1, 2017.
Ericsson, "LTE re-establishment when using NR PDCP (TP to 36.331 and 38.331)", R2-1713388, 3GPP TSG-RAN WG2 #100, Reno, Nevada, USA, Nov. 27-Dec. 1, 2017.
NTT Docomo, Inc., "Bearer type change with PDPC version change", R2-1713838, 3GPP TSG-RAN WG2 Meeting #100, Reno, USA, Nov. 27-Dec. 1, 2017.

* cited by examiner

```
<OMITTED>
fullConfig            ENUMERATED {true}                              OPTIONAL,
    <PARTLY OMITTED>
DRB-ToAddModList ::= SEQUENCE (size (1..maxQoSFlowID)) OF DRB-ToAddMod
    <PARTLY OMITTED>
DRB-ToAddMod ::= SEQUENCE {
    <PARTLY OMITTED>
    eps-BearerIdentity      INTEGER (0..15)                          OPTIONAL,
    drb-Identity            DRB-Identity                             OPTIONAL,
    pdcp-Config             PDCP-Config                              OPTIONAL,
    <PARTLY OMITTED>
}
    <PARTLY OMITTED>
DRB-Identity ::=            INTEGER (1..32)
    <OMITTED>
```

FIG. 6

TERMINAL APPARATUS, METHOD, AND INTEGRATED CIRCUIT

TECHNICAL FIELD

The present invention relates to a terminal apparatus, a method, and an integrated circuit.

This application claims priority to JP 2017-253552 filed on Dec. 28, 2017, the contents of which are incorporated herein by reference.

BACKGROUND ART

A radio access scheme and a radio network for cellular mobile communications (which will hereinafter be referred to as "Long Term Evolution (LTE (trade name))" or "Evolved Universal Terrestrial Radio Access (EUTRA)") and a core network (which will be referred to as "Evolved Packet Core (EPC)") have been studied by the 3rd Generation Partnership Project (3GPP).

As a radio access scheme and a radio network technology for a 5th generation cellular system, technical studies and standardization of LTE-Advanced Pro, which is an enhanced technology of LTE, and New Radio technology (NR), which is a new radio access technology, have been conducted by the 3GPP (NPL 1). 5 Generation Core Network (5GC), which is a core network for a 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501, "System Architecture for the 5G System; Stage 2"
NPL 3: 3GPP TS 36.300, "Evolved Universal Terrestrial Radio Access (E-UTRA) and Evolved Universal Terrestrial Radio Access Network (E-UTRAN); Overall description; Stage 2"
NPL 4: 3GPP TS 36.331, "Evolved Universal Terrestrial Radio Access (E-UTRA); Radio Resource Control (RRC); Protocol specifications"
NPL 5: 3GPP TS 36.323, "Evolved Universal Terrestrial Radio Access (E-UTRA); Packet Data Convergence Protocol (PDCP) specification"
NPL 6: 3GPP TS 36.322, "Evolved Universal Terrestrial Radio Access (E-UTRA); Radio Link Control (RLC) protocol specification"
NPL 7: 3GPP TS 36.321, "Evolved Universal Terrestrial Radio Access (E-UTRA); Medium Access Control (MAC) protocol specification"
NPL 8: 3GPP TS 37.340, "Evolved Universal Terrestrial Radio Access (E-UTRA) and NR; Multi-Connectivity; Stage 2"
NPL 9: 3GPP TS 38.300, "NR; NR and NG-RAN Overall description; Stage 2"
NPL 10: 3GPP TS 38.331, "NR; Radio Resource Control (RRC); Protocol specifications"
NPL 11: 3GPP TS 38.323, "NR; Packet Data Convergence Protocol (PDCP) specification"
NPL 12: 3GPP TS 38.322, "NR; Radio Link Control (RLC) protocol specification"
NPL 13: 3GPP TS 38.321, "NR; Medium Access Control (MAC) protocol specification"
NPL 14: 3GPP TS 23.401 v4.3.0, "General Packet Radio Service (GPRS) enhancements for Evolved Universal Terrestrial Radio Access Network (E-UTRAN) access"
NPL 15: 3GPP TS 23.502, "Procedure for 5G System; Stage 2"
NPL 16: 3GPP TS 37.324, "NR; Service Data Adaptation Protocol (SDAP) specification"

SUMMARY OF INVENTION

Technical Problem

As one of the technical studies of NR, a scheme called Multi-RAT Dual Connectivity (MR-DC) is being studied, which allows cells of Radio Access Technologies (RATs) of both E-UTRA and NR to be made into cell groups for each RAT and to be allocated to UE such that a terminal apparatus communicates with one or more base station apparatuses (NPL 8).

However, since the formats and functions of the communication protocols used in E-UTRA and NR differ, there is a problem in that protocol processing becomes complex compared to Dual Connectivity in conventional LTE using only E-UTRA as the RAT, and thus a base station apparatus and a terminal apparatus are not able to efficiently communicate with each other.

In view of the circumstances described above, an object of an aspect of the present invention is to provide a terminal apparatus capable of efficiently communicating with a base station apparatus, a method used for the terminal apparatus, and an integrated circuit mounted on the terminal apparatus.

Solution to Problem

In order to accomplish the object described above, an aspect of the present invention is contrived to provide the following means. Specifically, an aspect of the present invention is a terminal apparatus for communicating with one or more base station apparatuses, the terminal apparatus including: a receiver configured to receive an RRC reconfiguration message including a DRB configuration from the one or more base station apparatuses, the DRB configuration including a DRB identity and an EPS bearer identity; and a processing unit configured to associate a DRB established with the EPS identity in a case that the DRB identity is not part of a current configuration of the terminal apparatus, the terminal apparatus is configured with EN-DC, and the DRB was configured for the EPS bearer identity before the RRC reconfiguration message is received.

An aspect of the present invention is a communication method for a terminal apparatus for communicating with one or more base station apparatuses, the communication method including the steps of: receiving an RRC reconfiguration message including a DRB configuration from the one or more base station apparatuses, the DRB configuration including a DRB identity and an EPS bearer identity; and associating a DRB established with the EPS identity in a case that the DRB identity is not part of a current configuration of the terminal apparatus, the terminal apparatus is configured with EN-DC, and the DRB was configured for the EPS bearer identity before the RRC reconfiguration message is received.

An aspect of the present invention is a base station apparatus for communicating with a terminal apparatus, the base station apparatus including: a transmitter configured to transmit an RRC reconfiguration message including a DRB configuration to the terminal apparatus, the DRB configuration including a DRB identity and an EPS bearer identity; and a processing unit configured to cause the terminal apparatus to perform processing to associate a DRB established with the EPS identity in a case that the DRB identity is not part of a current configuration of the terminal apparatus, the terminal apparatus is configured with EN-DC, and the DRB was configured for the EPS bearer identity before the terminal apparatus receives the RRC reconfiguration message.

An aspect of the present invention is a communication method for a base station apparatus for communicating with a terminal apparatus, the communication method including the steps of: transmitting an RRC reconfiguration message including a DRB configuration to the terminal apparatus, the DRB configuration including a DRB identity and an EPS bearer identity; and causing the terminal apparatus to perform processing to associate a DRB established with the EPS identity in a case that the DRB identity is not part of a current configuration of the terminal apparatus, the terminal apparatus is configured with EN-DC, and the DRB was configured for the EPS bearer identity before the terminal apparatus receives the RRC reconfiguration message.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus can lower complexity of protocol processing and communicate efficiently.

BRIEF DESCRIPTION OF DRAWINGS

FIG. 6 is a diagram illustrating an example of information related to a DRB configuration and Abstract Syntax Notation One (ASN.1) description of the information according to each embodiment of the present invention.

DESCRIPTION OF EMBODIMENTS

Embodiments of the present invention will be described below in detail with reference to the drawings.

LTE (and LTE-A Pro) and NR may be defined as different RATs. NR may be defined as a technology included in LTE. LTE may be defined as a technology included in NR. LTE capable of connecting with NR through Multi RAT Dual connectivity may be distinguished from conventional LTE. The present embodiment may be applied to NR, LTE, and other RATs. Terms related to LTE and NR are used in the following description. However, the present invention may be applied to other technologies using other terms. The term E-UTRA in the present embodiment may be replaced with the term LTE, or the term LTE may be replaced with the term E-UTRA.

Figure 1:
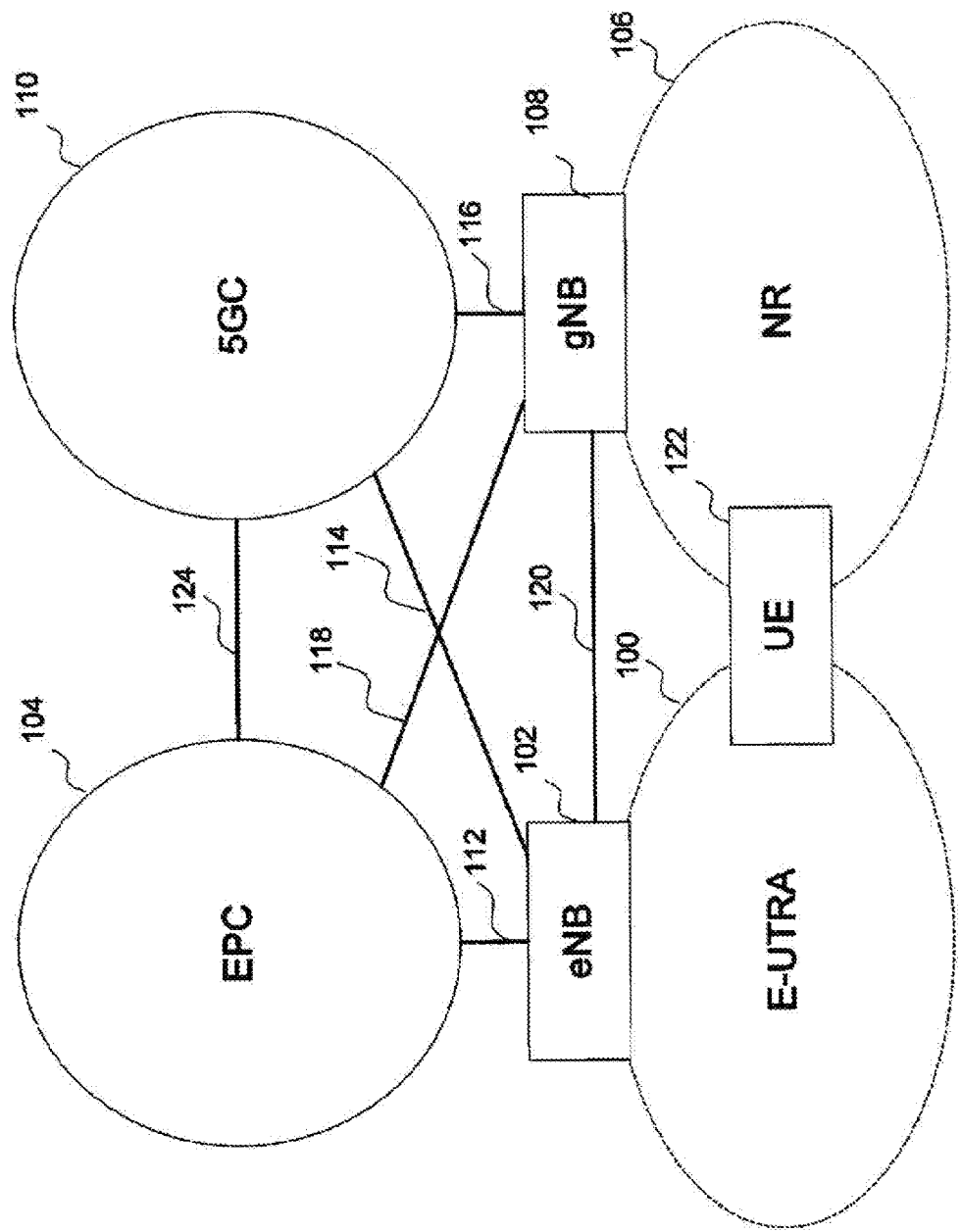
FIG. 1 is a schematic diagram of a communication system according to each embodiment of the present invention.

FIG. 1 is a schematic diagram of a communication system according to embodiments of the present invention.

An E-UTRA 100 is a radio access technology described in NPL 3 or the like, and is constituted by Cell Groups (CG) configured in one or multiple frequency bands. An E-UTRAN Node B (eNB) 102 is a base station apparatus of E-UTRA. An Evolved Packet Core (EPC) 104 is a core network described in NPL 14 or the like and is designed as a core network for E-UTRA. An interface 112 is an interface between the eNB 102 and the EPC 104, where there is a Control Plane (CP) through which control signals transfer and a User Plane (UP) through which user data transfers.

An NR 106 is a new radio access technology that is currently being studied by the 3GPP and includes Cell Groups (CGs) that are configured in one or multiple frequency bands. A gNode B (gNB) 108 is an NR base station apparatus. A 5GC 110 is a new core network for NR that is currently being studied by 3GPP, and is described in NPL 2 and the like.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, and the interface 124 are interfaces that transfer CP only, or UP only, or both the CP and the UP, and details are being discussed by 3GPP. The interface 114, the interface 116, the interface 118, the interface 120, and the interface 124 may not exist depending on communication systems provided by the network operators.

A UE 122 is a terminal apparatus supporting NR or supporting both the E-UTRA and the NR.

Figure 2:
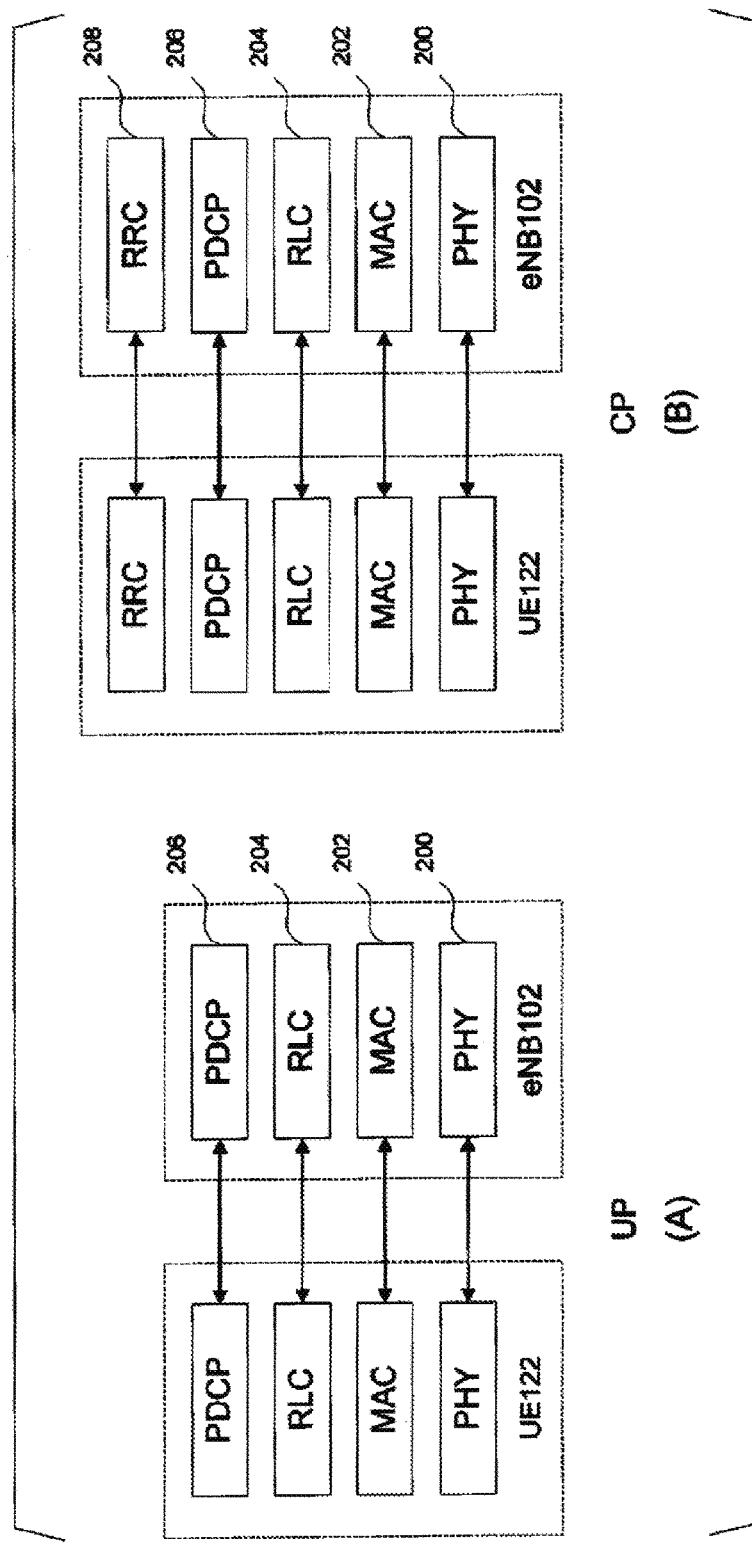
FIG. 2 is a diagram of protocol stacks of UP and CP of a terminal apparatus and a base station apparatus in E-UTRA according to each embodiment of the present invention.

FIG. 2 is a diagram of Protocol Stacks of UP and CP of a terminal apparatus and a base station apparatus in E-UTRA radio access layers according to embodiments of the present invention.

FIG. 2(A) is a diagram of a protocol stack of the UP used in a case that the UE 122 communicates with the eNB 102.

A Physical layer (PHY) 200 is a radio physical layer for providing a transmission service to a higher layer by using Physical Channels. The PHY 200 is connected with a Medium Access Control layer (MAC) 202 that is a higher layer described below via Transport Channels. Data is exchanged between the MAC 202 and the PHY 200 via transport channels. Data is transmitted and/or received via radio physical channels between the PHYs of the UE 122 and the eNB 102.

The MAC 202 maps various Logical Channels to various transport channels. The MAC 202 is connected with a Radio Link Control layer (RLC) 204 that is a higher layer described below via logical channels. The logical channels are roughly classified depending on the types of information transmitted, specifically, classified into control channels for transmitting control information and traffic channels for transmitting user information. The MAC 202 has a function of controlling the PHY 200 in order to perform discontinuous reception and transmission (DRX and DTX), a function of performing a Random Access procedure, a function of reporting transmit power information, a function of performing HARQ control, and the like (NPL 7).

The RLC 204 divides (Segmentation) data received from a Packet Data Convergence Protocol Layer (PDCP) 206 which is a higher layer described below, and adjusts the data size such that a lower layer can properly transmit data. The RLC 200 also has a function of ensuring Quality of Service (QoS) required for each piece of data. In other words, the RLC 204 has a function of data retransmission control or the like (NPL 6).

The PDCP 206 may have a header compression function of compressing unnecessary control information in order to efficiently transmit an IP Packet, which is user data, in a radio segment. The PDCP 206 may also have a data encryption function (NPL 5).

Note that data processed in the MAC 202, the RLC 204, and the PDCP 206 is referred to as a MAC Protocol Data Unit (PDU), an RLC PDU, and a PDCP PDU, respectively. Data transferred from a higher layer to the MAC 202, the RLC 204, and the PDCP 206, or data transferred to a higher layer is referred to as a MAC Service Data Unit (SDU), an RLC SDU, and a PDCP SDU, respectively.

FIG. 2(B) is a diagram of a protocol stack of the CP used in a case that the UE 122 communicates with the eNB 102.

In addition to the PHY 200, the MAC 202, the RLC 204, and the PDCP 206, there is a Radio Resource Control layer (RRC) 208 in the protocol stack of CP. The RRC 208 configures or reconfigures Radio Bearers (RBs) or the like to control the logical channels, the transport channels, and the physical channels. The RBs may be classified into a Signaling Radio Bearer (SRB) and a Data Radio Bearer (DRB), and the SRB may be used as a path for transmitting an RRC message which is control information. The DRB may be used as a path for transmitting user data. Each RB may be configured between the RRCs 208 of the eNB 102 and the UE 122 (NPL 4).

The functional classification of the MAC 202, the RLC 204, the PDCP 206, and the RRC 208 described above is an example, and some or all of the respective functions may not be implemented. Some or all of the functions of each layer may be included in another layer.

Figure 3:
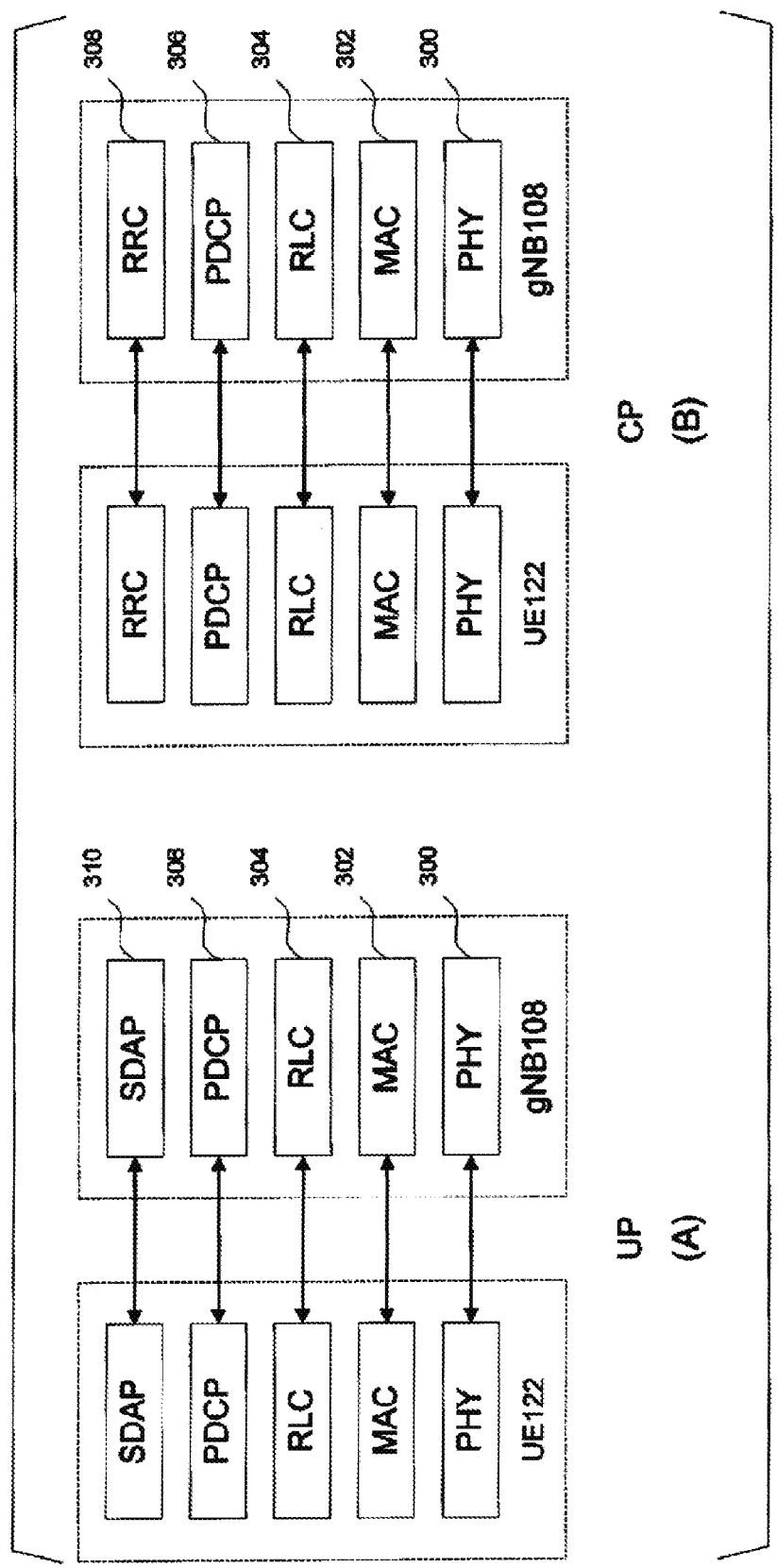
FIG. 3 is a diagram of protocol stacks of UP and CP of a terminal apparatus and a base station apparatus in NR according to each embodiment of the present invention.

FIG. 3 is a diagram of Protocol Stacks of UP and CP of a terminal apparatus and a base station apparatus in NR radio access layers according to embodiments of the present invention.

FIG. 3(A) is a diagram of a protocol stack of the UP used in a case that the UE 122 communicates with the gNB 108.

A Physical layer (PHY) 300 is a radio physical layer of NR and may provide a transmission service to a higher layer by using Physical Channels. The PHY 300 may be connected with a Medium Access Control layer (MAC) 302 which is a higher layer described below via Transport Channels. Data may be exchanged between the MAC 302 and the PHY 300 via transport channels. Data may be transmitted and/or received between the PHYs of the UE 122 and the gNB 108 via radio physical channels. Details of the PHY 300 are different from those of the radio physical layer PHY 200 of E-UTRA and are under discussion by 3GPP.

The MAC 302 may map various Logical Channels to various transport channels. The MAC 302 may be connected with a Radio Link Control layer (RLC) 304 which is a high layer described below via logical channels. The logical channels are roughly classified depending on the types of information transmitted, and may be classified into control channels for transmitting control information and traffic channels for transmitting user information. The MAC 302 may have a function of controlling the PHY 300 in order to perform discontinuous reception and transmission (DRX and DTX), a function of performing a Random Access procedure, a function of reporting transmit power information, a function of performing HARQ control, and the like (NPL 13). Details of the MAC 302 are different from those of the MAC 202 of E-UTRA, and are under discussion by 3GPP.

The RLC 304 may divide (Segmentation) data received from a Packet Data Convergence Protocol Layer (PDCP) 206 which is a higher layer described below, and adjust the data size such that a lower layer can properly transmit data. The RLC 304 may also have a function of ensuring Quality of Service (QoS) required for each piece of data. In other words, the RLC 304 may have a function of data retransmission control or the like (NPL 12). Details of the RLC 304 are different from those of the RLC 204 of E-UTRA, and are under discussion by 3GPP.

The PDCP 306 may have a header compression function of compressing unnecessary control information in order to efficiently transmit an IP Packet, which is user data, in a radio segment. The PDCP 306 may also have a data encryption function (NPL 11). Details of the PDCP 306 are different from those of the PDCP 206 of E-UTRA, and are under discussion by 3GPP.

A Service Data Adaptation Protocol (SDAP) 310 may perform mapping of a downlink QoS flow and a DRB transmitted from the core network to the terminal apparatus via the base station apparatus, perform mapping of an uplink QoS information flow and a DRB transmitted from the terminal apparatus to the core network via the base station apparatus, and have a function of storing mapping rule information (NPL 16). The QoS flow includes one or multiple Service Data Flows (SDF) that are processed by the same QoS policy (NPL 2). The SDAP may have a function of Reflective QoS, which performs a mapping of an uplink QoS flow and a DRB, based on information of a downlink QoS flow (NPL 2, NPL 16). Details are under discussion by 3GPP.

Note that the IP layer, and the Transmission Control Protocol (TCP) layer, the User Datagram Protocol (UDP) layer, the application layer, and the like, higher than the IP layer, are higher layers of the SDAP (not illustrated). In the SDAP of the terminal apparatus, a layer for performing association between a service data flow and a QoS flow is also a higher layer of the SDAP.

Note that data processed in the MAC 302, the RLC 304, the PDCP 306, and the SDAP 310 may be referred to as a MAC Protocol Data Unit (PDU), an RLC PDU, a PDCP PDU, and an SDAP PDU, respectively. Data transferred from a higher layer to the MAC 202, the RLC 204, and the PDCP 206, or data transferred to a higher layer may be referred to as a MAC Service Data Unit (SDU), an RLC SDU, a PDCP SDU, and an SDAP SDU, respectively.

FIG. 3(B) is a diagram of a protocol stack of the CP used in a case that the UE 122 communicates with the gNB 108.

In addition to the PHY 300, the MAC 302, the RLC 304, and the PDCP 306, there is a Radio Resource Control layer (RRC) 308 in the protocol stack of CP. The RRC 308 may configure or reconfigure Radio Bearers (RBs) or the like to control the logical channels, the transport channels, and the physical channels. The RBs may be classified into a Signaling Radio Bearer (SRB) and a Data Radio Bearer (DRB), and the SRB may be used as a path for transmitting an RRC message which is control information. The DRB may be used as a path for transmitting user data. Each RB may be configured in the RRCs 308 of the gNB 108 and the UE 122 (NPL 10).

The functional classification of the MAC 302, the RLC 304, the PDCP 306, the SDAP 310, and the RRC 308 described above is an example, and some or all of the respective functions may not be implemented. Some or all of the functions of each layer may be included in another layer.

Note that, according to embodiments of the present invention, the MAC 202, the RLC 204, the PDCP 206, and the RRC 208 may be referred to as MAC for E-UTRA or MAC for LTE, RLC for E-UTRA or RLC for LTE, PDCP for E-UTRA or PDCP for LTE, and RRC for E-UTRA or RRC for LTE, respectively, to distinguish protocols of E-UTRA and protocols of NR hereinbelow. The MAC 302, the RLC 304, the PDCP 306, and the RRC 308 may also be referred to as MAC for NR, RLC for NR, RLC for NR, and RRC for NR, respectively. Alternatively, the PDCP 306 may be described by using space such as E-UTRA PDCP or LTE PDCP, and NR PDCP.

As illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. The PDCP 206 in FIG. 2 may also be replaced with the PDCP 306 in FIG. 3. The RRC 308 in FIG. 3 may include the functions of the RRC 208 in FIG. 2. The PDCP 306 in FIG. 3 may be the PDCP 206 in FIG. 2.

Embodiment 1

Embodiment 1 of the present invention will be described with reference to FIG. 1, FIG. 2, and FIG. 4 to FIG. 8.

Figure 4:
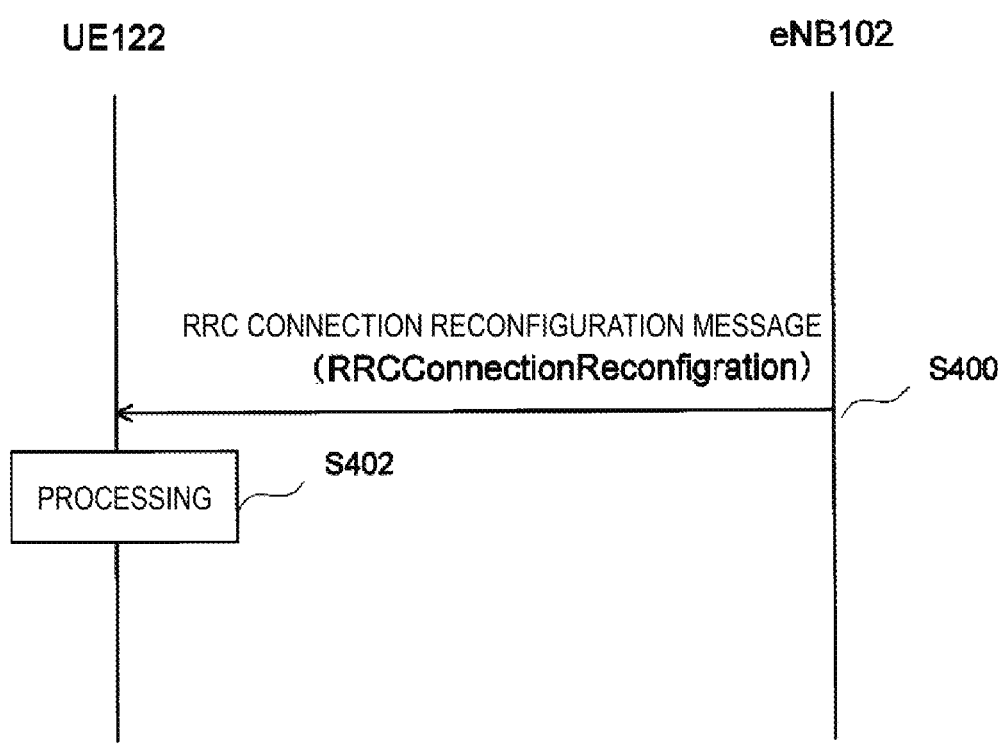
FIG. 4 is a diagram illustrating an example of a flow of an RRC connection reconfiguration procedure according to each embodiment of the present invention.

FIG. 4 is a diagram illustrating an example of a flow of an RRC connection reconfiguration procedure according to each embodiment of the present invention.

The RRC Connection Reconfiguration procedure includes procedures used for handover, Measurement, and the like, in addition to establishing, changing, and releasing of the RB, and changing, releasing, and the like of the secondary cell in LTE as disclosed in NPL 4. In MR-DC, especially, in E-UTRA-NR Dual Connectivity (EN-DC), which is MR-DC in a case that the core network is the EPC 104 and the master node is the eNB 102, and NG-RAN E-UTRA-NR Dual Connectivity (NGEN-DC), which is MR-DC in a case that the core network is the 5GC 110 and the master node is the eNB 102, the RRC connection reconfiguration procedure is used not only for LTE, but also to perform a part of handover, Measurement, and the like, in addition to performing a part of establishment, change, and release of the RB, and change, release, and the like of the secondary cell in NR as disclosed in NPL 10. In each embodiment of the present invention, the procedures used for establishing, changing, and releasing the RB, adding, changing, and releasing a cell group, the handover and Measurement, and the like in NR may be referred to as an RRC connection reconfiguration procedure, or may have another designation. The procedures used for establishing, changing, and releasing the RB, adding, changing, and releasing a cell group, the handover and Measurement, and the like in each embodiment of the present invention may be procedures in NR as disclosed in NPL 10, and may be referred to as an RRC connection reconfiguration procedure. In each embodiment of the present invention, an RRC connection reconfiguration message (RRCConnectionReconfigration) transmitted from the eNB 102 to the UE 122 may be replaced with an RRC reconfiguration message RRCReconfigration transmitted from the gNB 108 to the UE 122.

In the RRC connection reconfiguration procedure, the UE 122 receives an RRC connection reconfiguration message (RRCConnectionReconfiguration) from the eNB 102 (step S400), and performs various configurations such as processing of configuration of DRBs or the like, for example, in accordance with the information included in the RRC connection reconfiguration message (step S402). After step S402, the UE 122 may transmit an RRC connection reconfiguration complete message (RRCConnectionReconfigrationComplete), or the like to the eNB 102 (not illustrated).

Figure 5:
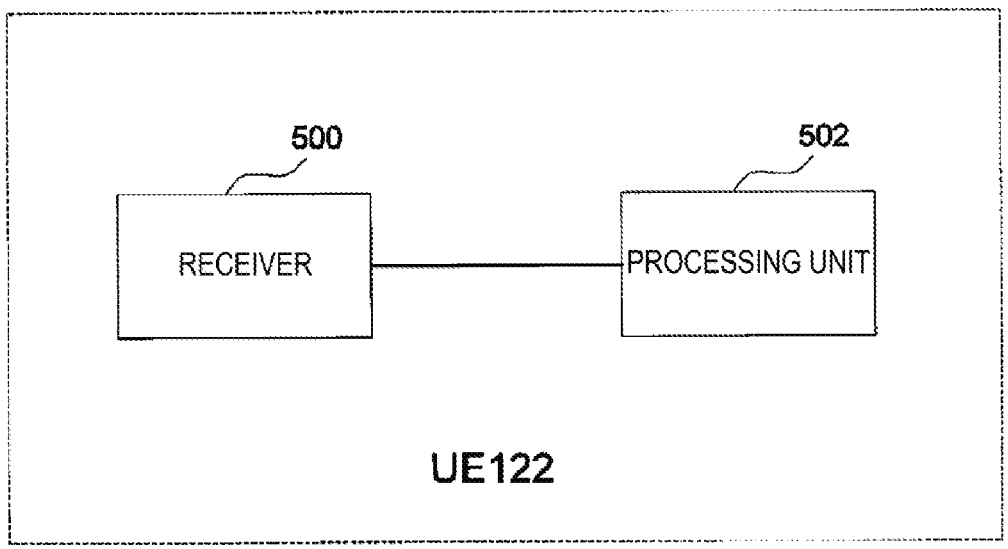
FIG. 5 is a block diagram illustrating a configuration of a terminal apparatus according to each embodiment of the present invention.

FIG. 5 is a block diagram illustrating a configuration of a terminal apparatus (UE 122) according to each embodiment of the present invention. Note that FIG. 5 illustrates only main components closely related to an aspect of the present invention in order to avoid complicated explanation.

The UE 122 illustrated in FIG. 5 includes a receiver 500 configured to receive an RRC connection reconfiguration message from the eNB 102, and a processing unit 502 configured to process the message.

FIG. 6 is an example of information related to LTE and Abstract Syntax Notation One (ASN.1) description of the information, of the DRB configuration in the cell group of the master node in EN-DC and NGEN-DC, of the information included in the RRC connection reconfiguration message in FIG. 4, in each embodiment of the present invention. The specifications related to RRC (NPL 4 and NPL 10) in the 3GPP describe messages, information (Information Element (IE)), and the like related to RRC by using ASN.1. In the example of ASN.1 of FIG. 6, <omitted> and <partly omitted> are not part of the description of ASN.1, but indicate that other pieces of information are omitted. Note that there may also be omitted information in a part where neither <omitted> or <partly omitted> is indicated. Note that ASN.1 in FIG. 6 does not exactly follow the ASN.1 notation method, but is an example of parameters of DRB configuration in an aspect of the present invention, and other names or other notations may be used. The example of ASN.1 in FIG. 6 illustrates only an example about main information closely related to an aspect of the present invention in order to avoid complicated explanation.

An Evolved Packet System (EPS) bearer used in the description below uniquely identifies a traffic flow that is handled as QoS common between the UE 122 and the EPC104, and an EPS bearer identity is an identifier used to identify each EPS bearer.

The information represented by fullConfig in FIG. 6 is information for indicating that a full configuration is applied, and may indicate that a full configuration is applied by using true, enable, or the like. The information represented by DRB-ToAddModList may be a list of information for indicating a configuration of DRBs to be added or modified represented by DRBToAddMod. The information represented by eps-BearerIdentity in DRB-ToAddMod (information for indicating a configuration of DRBs to be added or modified) may be information of Evolved Packet System (EPS) bearer identities for identifying EPS bearers described in NPL 3. In the example of FIG. 6, an integer value from 0 to 15 is used, but another value may be used. Information of an EPS bearer identity may correspond to the DRB to be configured in a one-to-one manner. The information represented by DRB-Identity in the information for indicating the configuration of the DRBs to be added or modified is information of the DRB identities of the DRBs to be added or modified. In the example of FIG. 6, an integer value from 1 to 32 is used, but another value may be used. The information represented by pdcp-Config in the information for indicating the configuration of the DRBs to be added or modified may be information related to a configuration of an LTE PDCP entity in order to establish or change the PDCP 206.

Some or all of the pieces of the information illustrated in FIG. 6 may be optional. In other words, the information illustrated in FIG. 6 may be included in the RRC connection reconfiguration message as necessary. For example, the information related to the configuration of the LTE PDCP entity may be included in a case that the LTE PDCP is used as the PDCP of the DRB in the UE 122 corresponding to EN-DC, or the information related to the configuration of the LTE PDCP entity may not be included in a case that the NR PDCP is used.

Note that in the UE 122, the configuration of the PDCP entity is configured depending on the corresponding RRC entity. In other words, the LTE PDCP entity configuration is configured depending on the RRC entity for LTE described in NPL 4, and the configuration of the NR PDCP entity is configured depending on the RRC entity for NR described in NPL 10. In a process performed in the RRC entity for LTE, it is determined whether the LTE PDCP is established or configured, and in a process performed in the RRC entity for NR, it is determined whether the NR PDCP is established or configured. Note that, in a case that information related to configuration of NR such as information related to the configuration of the NR PDCP entity is included in the RRC connection reconfiguration message received from the eNB 102 in the form of a container or the like, the UE 122 decodes and configures the NR RRC entity.

Note that in each embodiment of the present invention, information for indicating a configuration of a DRB to be added or modified may be described as a DRB configuration, information of an EPS bearer identity may be described as an EPS bearer identity, information of a DRB identity may be described as a DRB identity, and information related to a configuration of an LTE PDCP entity may be described as an LTE PDCP configuration.

Figure 7:
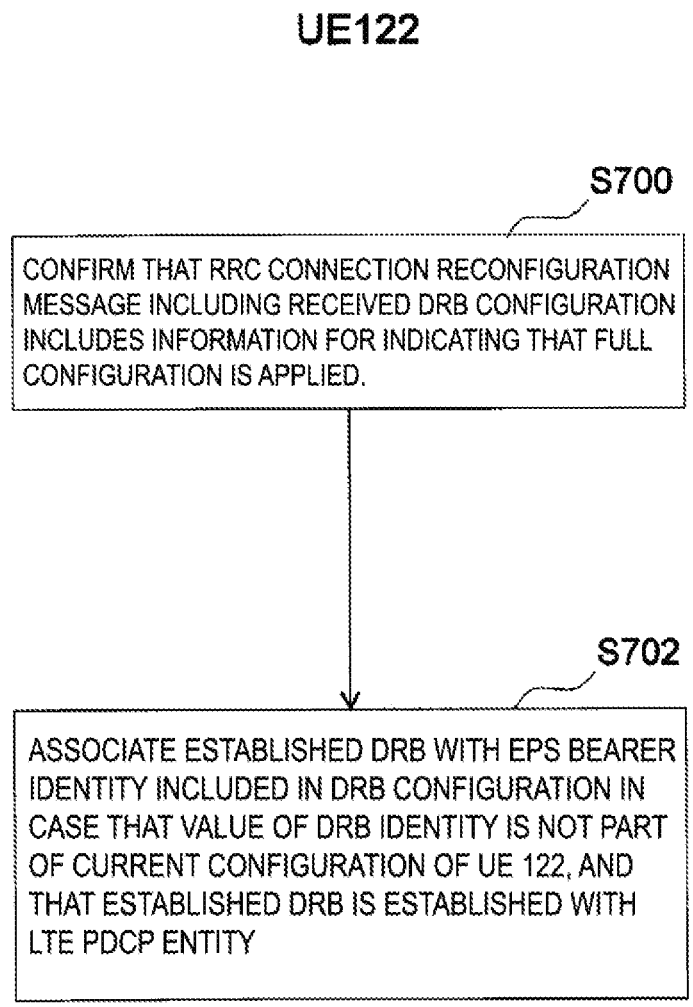
FIG. 7 is an example of a processing method according to Embodiment 1 of the present invention.
Figure 8:
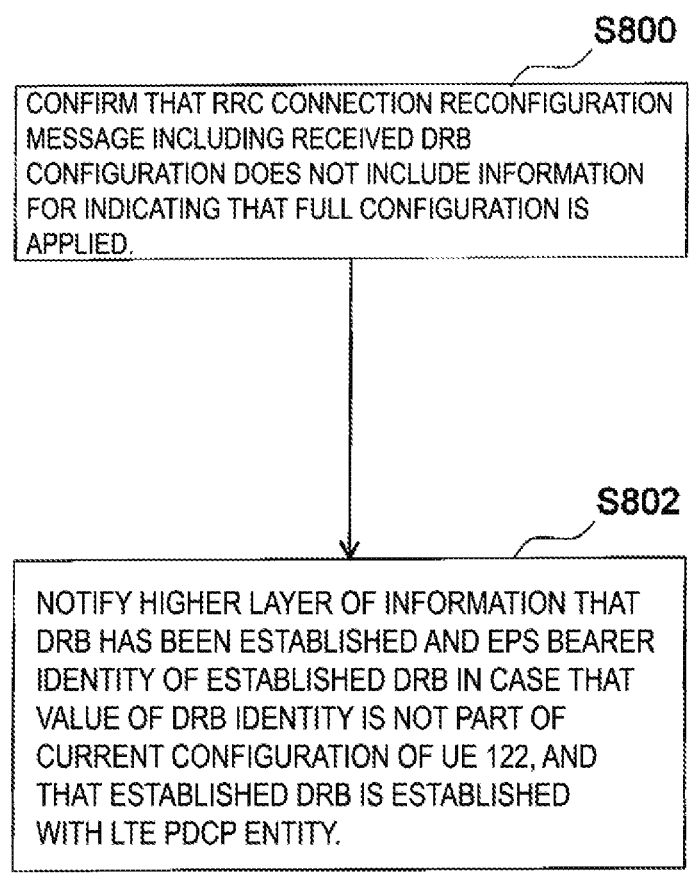
FIG. 8 is another example of a processing method according to Embodiment 1 of the present invention.

FIG. 7 illustrates an example of a processing method of the processing unit 502 of the UE 122 in FIG. 5 according to Embodiment 1 of the present invention, and FIG. 8 illustrates another example of a processing method of the processing unit 502 of the UE 122 in FIG. 5 according to Embodiment 1 of the present invention. Note that in the following description, a DRB configuration is included in a list of DRB configurations, and the processing for a DRB configuration in the processing unit 502 of the UE 122 is performed for each of DRB configurations included in a list of DRB configurations.

An example of a DRB configuration procedure will be described with reference to FIG. 5 to FIG. 7.

The processing unit 502 of the UE 122 confirms that the RRC connection reconfiguration message including the DRB configuration received by the receiver 500 includes information for indicating that a full configuration is applied (step S700).

Next, in a case that the value of a DRB identity included in the DRB configuration is not part of the current configuration of the UE 122, and that an established DRB having the DRB identity is established with an LTE PDCP entity, the processing unit 502 of the UE 122 associates the established DRB with the EPS bearer identity (step S702). In a case that the value of a DRB identity included in the DRB configuration is not part of the current configuration of the UE 122, and that an established DRB having the DRB identity is not established with an LTE PDCP entity, the processing unit 502 of the UE 122 does not associate the established DRB with the EPS bearer identity. Note that "in a case that an established DRB having the DRB identity is established with an LTE PDCP entity" may be replaced with "in a case that an established DRB having the DRB identity is established with a PDCP entity by LTE," or may be replaced with "an LTE PDCP entity configuration is included in the DRB configuration." Note that "in a case that an LTE PDCP entity is established" refers to a case that establishment of a PDCP entity is established in an RRC entity for LTE, and "an LTE PDCP configuration is included in the DRB configuration" refers to that a PDCP configuration is included in the DRB configuration of an RRC entity for LTE. Note that "in a case that an established DRB having the DRB identity is not established with an LTE PDCP entity" may be replaced with "in a case that an established DRB having the DRB identity is not established with a PDCP entity by LTE," or may be replaced with "an LTE PDCP entity configuration is not included in the DRB configuration." Note that "in a case that an LTE PDCP entity is not established" refers to a case that establishment of a PDCP entity is not established in an RRC entity for LTE, and "an LTE PDCP configuration is not included in the DRB configuration" refers to that a PDCP configuration is not included in the DRB configuration of an RRC entity for LTE.

Note that in FIG. 7, the order in which each piece of the information is confirmed may not be this order. Confirmation that information for indicating that a full configuration is applied is included may be performed after confirming in step S702 that the value of the information of the DRB identity is not part of the current configuration of the UE 122 or after confirming that an LTE PDCP entity is established.

Next, another example of a DRB configuration procedure will be described with reference to FIG. 5, FIG. 6, and FIG. 8.

The processing unit 502 of the UE 122 confirms that the RRC connection reconfiguration message including the DRB configuration received by the receiver 500 does not include information for indicating that a full configuration is applied (step S800).

Next, in a case that the value of a DRB identity included in the DRB configuration is not part of the current configuration of the UE 122, and in a case that an established DRB having the DRB identity is established with an LTE PDCP entity, the processing unit 502 of the UE 122 notifies a higher layer of the information that the DRB has been established and the EPS bearer identity of the established DRB (step S802). In a case that the value of a DRB identity included in the DRB configuration is not part of the current configuration of the UE 122, and in a case that an established DRB having the DRB identity is not established with an LTE PDCP entity, the processing unit 502 of the UE 122 does not notify a higher layer of the information that the DRB has been established and the EPS bearer identity of the established DRB. Note that "in a case that an established DRB having the DRB identity is established with an LTE PDCP entity" may be replaced with "in a case that an established DRB having the DRB identity is established with a PDCP entity by LTE," or may be replaced with "an LTE PDCP entity configuration is included in the DRB configuration." Note that "in a case that an LTE PDCP entity is established" refers to a case that establishment of a PDCP entity is established in an RRC entity for LTE, and "an LTE PDCP configuration is included in the DRB configuration" refers to that a PDCP configuration is included in the DRB configuration of an RRC entity for LTE. Note that "in a case that an established DRB having the DRB identity is not established with an LTE PDCP entity" may be replaced with "in a case that an established DRB having the DRB identity is not established with a PDCP entity by LTE," or may be replaced with "an LTE PDCP entity configuration is not included in the DRB configuration." Note that "in a case that an LTE PDCP entity is not established" refers to a case that establishment of a PDCP entity is not established in an RRC entity for LTE, and "an LTE PDCP configuration is not included in the DRB configuration" refers to that a PDCP configuration is not included in the DRB configuration of an RRC entity for LTE.

Note that in FIG. 8, the order in which each piece of the information is confirmed may not be this order. Confirmation that information for indicating that a full configuration is applied is not included may be performed after confirming in step S802 that the value of the information of the DRB identity is not part of the current configuration of the UE 122 or after confirming that an LTE PDCP entity is established.

In this way, according to Embodiment 1 of the present invention, the terminal apparatus can lower complexity of protocol processing and communicate efficiently.

Embodiment 2

Embodiment 2 of the present invention will be described with reference to FIG. 4 to FIG. 6, and FIG. 9 to FIG. 12. In Embodiment 2, the release process of the DRB with a PDCP version change from the LTE PDCP to the NR PDCP or from the NR PDCP to the LTE PDCP, or the release process of the DRB while maintaining the EPS bearer is described. Note that Embodiment 2 of the present invention may be adapted in a case that EN-DC is configured.

Figure 9:
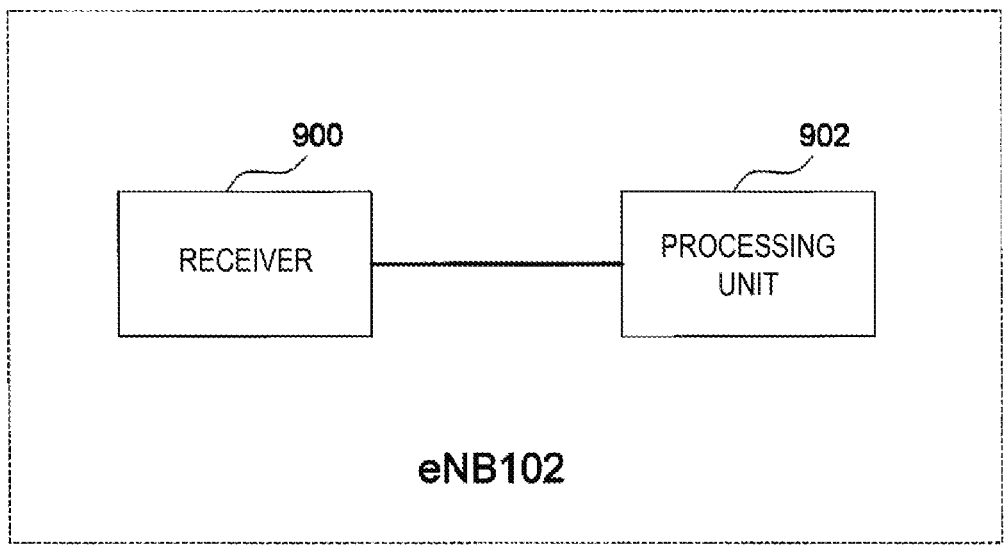
FIG. 9 is a block diagram illustrating a configuration of a base station apparatus according to each embodiment of the present invention.

FIG. 9 is a block diagram illustrating a configuration of a base station apparatus (eNB 102) according to each embodiment of the present invention. Note that FIG. 9 illustrates only main components closely related to an aspect of the present invention in order to avoid complicated explanation.

The eNB 102 illustrated in FIG. 9 includes a transmitter 900 configured to transmit an RRC connection reconfiguration message from the UE 122 and a processing unit 902 configured to crease the RRC connection reconfiguration message.

The processing unit 902 of the eNB 102 creates an RRC connection reconfiguration message and transmits the message to the UE 122 from the transmitter 900 (step S400). The receiver 500 of the UE 122 receives the RRC connection reconfiguration message, and the processing unit 502 performs processing in accordance with the RRC connection reconfiguration message (step S402).

Figure 10:
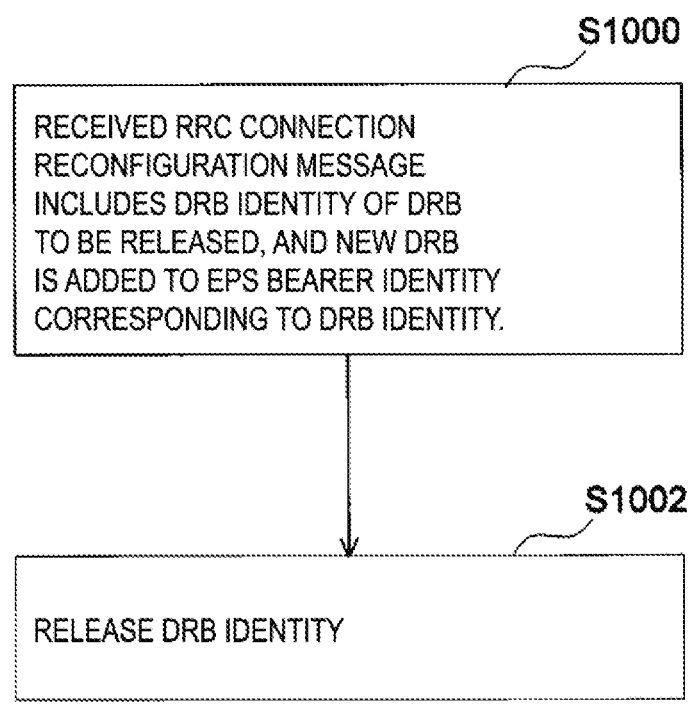
FIG. 10 is an example of a processing method according to Embodiment 2 of the present invention.
Figure 12:
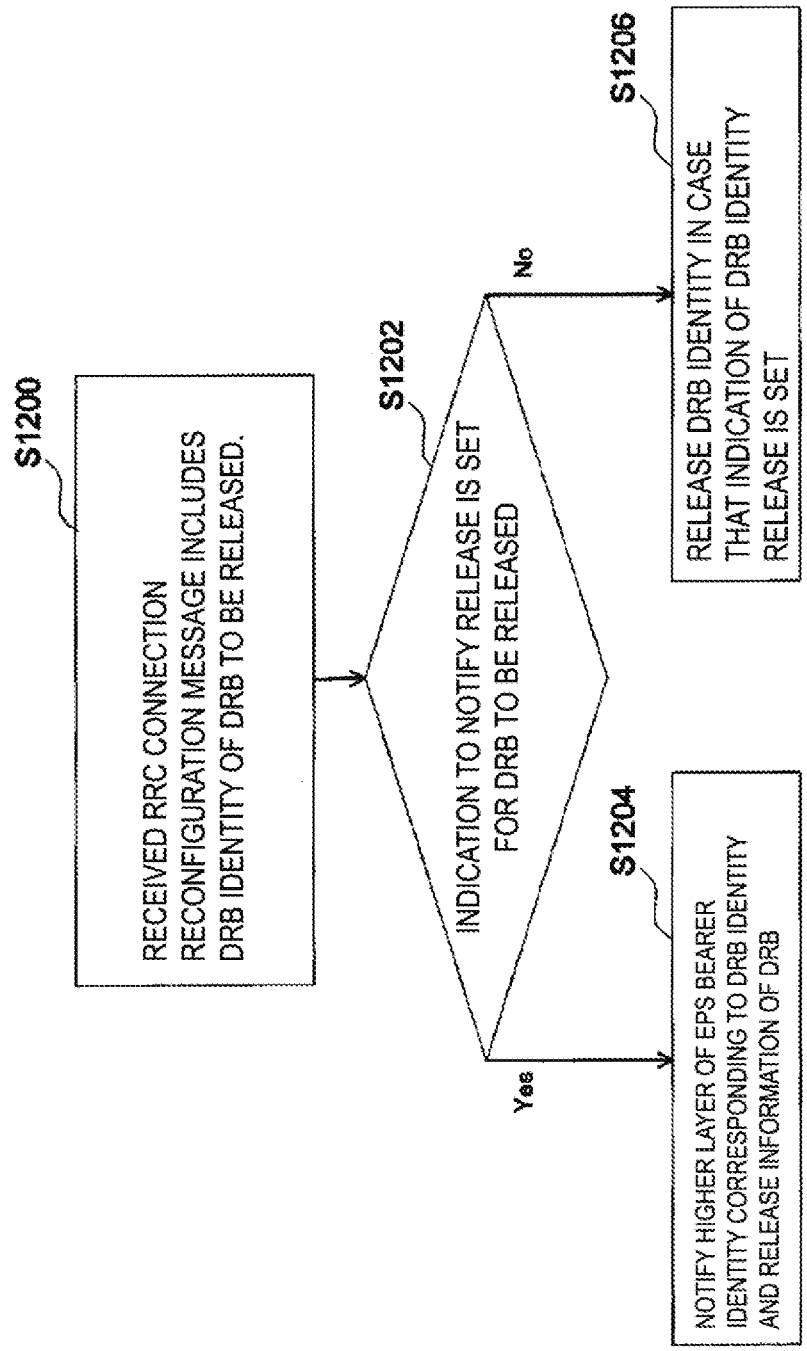
FIG. 12 is a third example of a processing method according to Embodiment 2 of the present invention.

FIG. 10 illustrates an example of a processing method of the processing unit 502 of the UE 122 in FIG. 5 according to Embodiment 2 of the present invention, FIG. 10 illustrates a second example of a processing method of the processing unit 502 of the UE 122 in FIG. 5 according to Embodiment 2 of the present invention, and FIG. 12 illustrates a third example of a processing method of the processing unit 502 of the UE 122 in FIG. 5 according to Embodiment 2 of the present invention. Note that in the following description, a DRB configuration is included in a list of DRB configurations, and the processing for a DRB configuration in the processing unit 502 of the UE 122 is performed for each of DRB configurations included in a list of DRB configurations.

In FIG. 10, the processing unit 502 of the UE 122 confirms that the RRC connection reconfiguration message received from the receiver 500 includes a DRB identity of a DRB to be released, and that a new DRB is added to an EPS bearer identity corresponding to the DRB identity. (step S1000).

Next, the processing unit 502 of the UE 122 releases the DRB identity. (step S1002). In step S1002, the processing unit 502 of the UE 122 may further transmit a notification to an NR RRC entity that a new DRB is established for the EPS bearer identity corresponding to the DRB identity.

Figure 11:
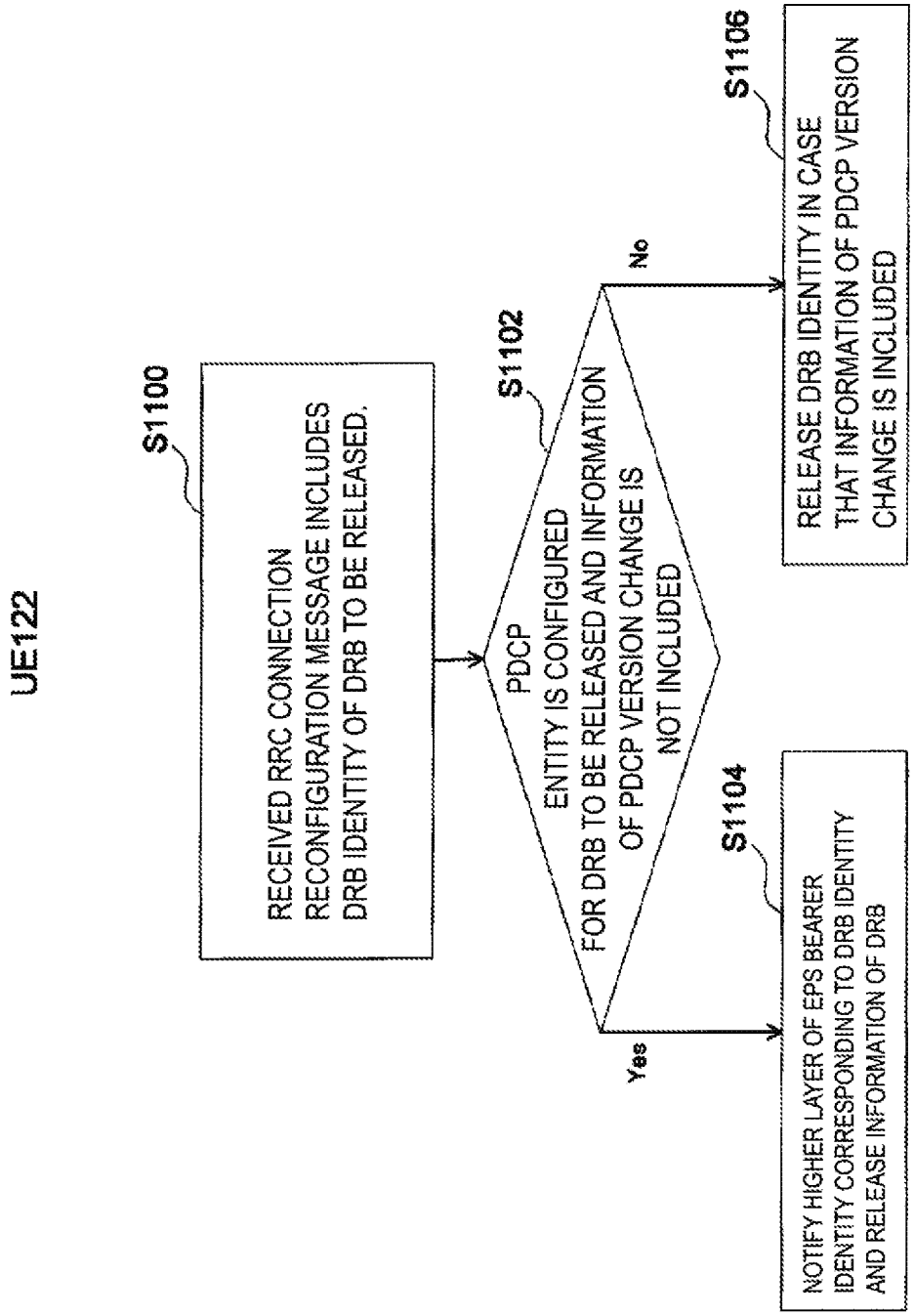
FIG. 11 is a second example of a processing method according to Embodiment 2 of the present invention.

In FIG. 11, the processing unit 502 of the UE 122 confirms that the RRC connection reconfiguration message received from the receiver 500 includes a DRB identity of a DRB to be released. (step S100).

Next, the processing unit 502 of the UE 122 checks that a PDCP entity is configured for the DRB to be released and that the RRC connection reconfiguration message does not include information of a PDCP version change (not illustrated in FIG. 6) (step S1102). In a case of confirmed, the processing unit 502 of the UE 122 notifies a higher layer of the EPS bearer identity corresponding to the DRB identity and the release information of the DR B. (step S1104)

In step S1102, in a case that the processing unit 502 of the UE 122 fails to confirm that an PDCP entity is configured for the DRB to be released and that the RRC connection reconfiguration message does not include information of a PDCP version change, the processing unit 502 of the UE 122 checks that the RRC connection reconfiguration message includes information of a PDCP version change, and in a case of confirmed, releases the DRB identity (step S1106).

In FIG. 12, the processing unit 502 of the UE 122 confirms that the RRC connection reconfiguration message received from the receiver 500 includes a DRB identity of a DRB to be released. (step S1200).

Next, the processing unit 502 of the UE 122 checks that an indication to notify the release is set for the DRB to be released (not illustrated in FIG. 6) (step S1202). In a case of confirmed, the processing unit 502 of the UE 122 notifies a higher layer of the EPS bearer identity corresponding to the DRB identity and the release information of the DR B. (step S1204)

In step S1202, in a case that the processing unit 502 of the UE 122 confirms that an indication to notify the release is not set for the DRB to be released, the processing unit 502 of the UE 122 checks that a release indication (not illustrated in FIG. 6) of a DRB identity is set for the DRB identity. In a case of confirmed, the processing unit 502 of the UE 122 releases the DRB identity (step S1206).

In this way, according to Embodiment 2 of the present invention, the terminal apparatus can lower complexity of protocol processing and communicate efficiently.

Embodiment 3

Embodiment 3 of the present invention will be described with reference to FIG. 4 to FIG. 6, FIG. 9, and FIG. 13 to FIG. 15. In Embodiment 3, the DRB addition process after releasing the DRB with PDCP version change from the LTE PDCP to the NR PDCP or from the NR PDCP to the LTE PDCP, or the DRB addition process after releasing the DRB while maintaining the EPS bearer is described. Note that Embodiment 3 of the present invention may be adapted in a case that EN-DC is configured.

FIG. 9 is a block diagram illustrating a configuration of a base station apparatus (eNB 102) according to each embodiment of the present invention. Note that FIG. 9 illustrates only main components closely related to an aspect of the present invention in order to avoid complicated explanation.

The eNB 102 illustrated in FIG. 9 includes a transmitter 900 configured to transmit an RRC connection reconfiguration message from the UE 122 and a processing unit 902 configured to crease the RRC connection reconfiguration message.

The processing unit 902 of the eNB 102 creates an RRC connection reconfiguration message and transmits the message to the UE 122 from the transmitter 900 (step S400). The receiver 500 of the UE 122 receives the RRC connection reconfiguration message, and the processing unit 502 performs processing in accordance with the RRC connection reconfiguration message (step S402).

Figure 13:
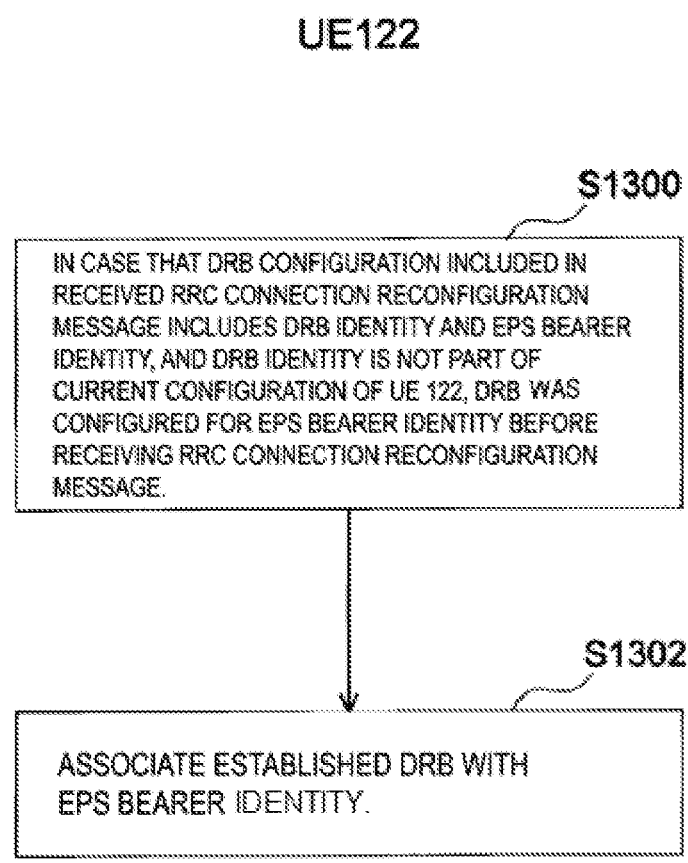
FIG. 13 is an example of a processing method according to Embodiment 3 of the present invention.
Figure 14:
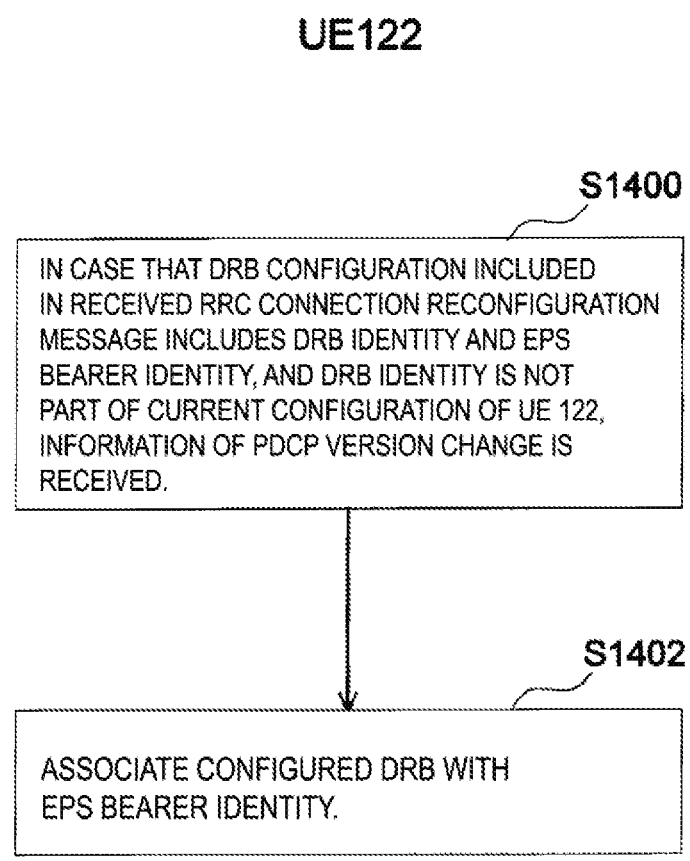
FIG. 14 is a second example of a processing method according to Embodiment 3 of the present invention.
Figure 15:
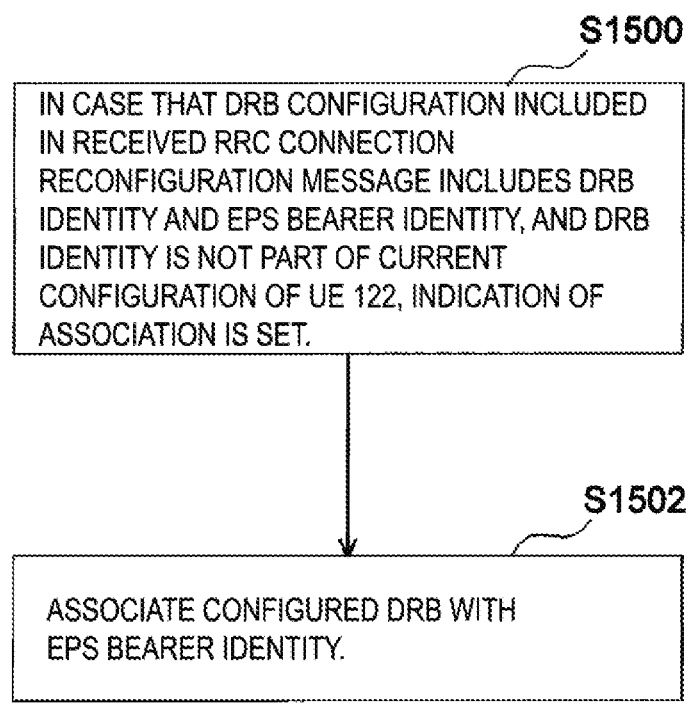
FIG. 15 is a third example of a processing method according to Embodiment 3 of the present invention.

FIG. 13 illustrates an example of a processing method of the processing unit 502 of the UE 122 in FIG. 5 according to Embodiment 3 of the present invention, FIG. 14 illustrates a second example of a processing method of the processing unit 502 of the UE 122 in FIG. 5 according to Embodiment 3 of the present invention, and FIG. 15 illustrates a third example of a processing method of the processing unit 502 of the UE 122 in FIG. 5 according to Embodiment 3 of the present invention. Note that in the following description, a DRB configuration is included in a list of DRB configurations, and the processing for a DRB configuration in the processing unit 502 of the UE 122 is performed for each of DRB configurations included in a list of DRB configurations.

In FIG. 13, the processing unit 502 of the UE 122 confirms that the RRC connection reconfiguration message received from the receiver 500 includes a DRB configuration, and that the DRB configuration includes a DRB identity and an EPS bearer identity, and confirms that the DRB identity is not part of the current configuration of UE 122, and that a DRB was configured for the EPS bearer identity before receiving the RRC connection reconfiguration message (step S1300).

Next, the processing unit 502 of the UE 122 associates the DRB established according to the DRB configuration with the EPS bearer (step S1302).

In FIG. 14, the processing unit 502 of the UE 122 confirms that the RRC connection reconfiguration message received from the receiver 500 includes a DRB configuration, and that the DRB configuration includes a DRB identity and an EPS bearer identity, and confirms that the DRB identity is not part of the current configuration of UE 122, and that the RRC connection reconfiguration message includes information of a PDCP version change (step S1400). In a case of confirmed, the processing unit 502 of the UE 122 associates the DRB established according to the DRB configuration with the EPS bearer (step S1402).

In FIG. 15, the processing unit 502 of the UE 122 confirms that the RRC connection reconfiguration message received from the receiver 500 includes a DRB configuration, and that the DRB configuration includes a DRB identity and an EPS bearer identity, and confirms that the DRB identity is not part of the current configuration of UE 122, and that an indication of association is set for the DRB configuration (step S1500). In a case of confirmed, the processing unit 502 of the UE 122 associates the DRB established according to the DRB configuration with the EPS bearer (step S1502).

In this way, according to Embodiment 3 of the present invention, the terminal apparatus can lower complexity of protocol processing and communicate efficiently.

Note that the DRB configuration according to the embodiments of the present invention may be included in an RRC Establishment procedure and an RRC Re-Establishment procedure, in addition to the RRC connection reconfiguration procedure.

In the embodiments of the present invention, "LTE PDCP" is described, but "PDCP" may be described without adding LTE in a case that it is clear to be a PDCP configured by an RRC entity for LTE described in NPL 4.

In each embodiment of the present invention, the higher layer of the SDAP may be a Non Access Strarum (NAS). The higher layer of the RRC may be an NAS.

In each embodiment of the present invention, information for indicating that a full configuration is applied may be replaced with information for indicating that a DRB is released and then added, or may be information for indicating that the EPS bearer is maintained. The information may be information with other names as long as it is information for indicating that the DRB release and addition corresponding to the EPS bearer is performed while maintaining the EPS bearer.

In each embodiment of the present invention, information for indicating a PDCP version change may be replaced with information for indicating that a DRB is released and then added, or may be information for indicating that the EPS bearer is maintained. The information may be information with other names as long as it is information for indicating that the DRB release and addition corresponding to the EPS bearer is performed while maintaining the EPS bearer.

A program running on an apparatus according to an aspect of the present invention may serve as a program that controls a Central Processing Unit (CPU) and the like to cause a computer to operate in such a manner as to realize the functions of the above-described embodiments according to the aspect of the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. The "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. The above-described program may be configured to realize some of the functions described above, and additionally may be configured to realize the functions described above, in combination with a program already recorded in the computer system.

Each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a digital signal processor (DSP), an application specific integrated circuit (ASIC), a field programmable gate array (FPGA), or other programmable logic devices, discrete gates or transistor logics, discrete hardware components, or combinations thereof. The general-purpose processor may be a microprocessor, or the processor may be a processor of known type, a controller, a micro-controller, or a state machine instead. The general-purpose processor or the above-mentioned circuits may be configured of a digital circuit, or may be configured of an analog circuit. In a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of an aspect of the present invention defined by claims, and embodiments that are made by suitably combining technical means disclosed according to different embodiments are also included in the technical scope of the present invention. A configuration in which constituent elements, described in the embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
500 Receiver
502, 902 Processing unit
900 Transmitter

The invention claimed is:

1. A terminal apparatus for communicating with one or more base station apparatuses, the terminal apparatus comprising:
    a receiver configured to receive, from the one or more base station apparatuses, a Radio Resource Control (RRC) reconfiguration message including a Data Radio Bearer (DRB) configuration, the DRB configuration including a DRB identity and an Evolved Packet System (EPS) bearer identity; and
    processing circuitry configured to, in a case that the DRB identity is not part of a current configuration of the terminal apparatus, and an established DRB was configured for the EPS bearer identity before the RRC reconfiguration message was received, associate the established DRB with the EPS bearer identity,
    wherein the DRB configuration is configured by a New Radio (NR) RRC.

2. A communication method for a terminal apparatus for communicating with one or more base station apparatuses, the communication method comprising:
    receiving, from the one or more base station apparatuses, a Radio Resource Control (RRC) reconfiguration message including a Data Radio Bearer (DRB) configuration, the DRB configuration including a DRB identity and an Evolved Packet System (EPS) bearer identity; and
    associating an established DRB with the EPS bearer identity in a case that the DRB identity is not part of a current configuration of the terminal apparatus, and the established DRB was configured for the EPS bearer identity before the RRC connection reconfiguration message was received,
    wherein the DRB configuration is configured by a New Radio (NR) RRC.

3. A base station apparatus for communicating with a terminal apparatus, the base station apparatus comprising:
    a transmitter configured to transmit, to the terminal apparatus, a Radio Resource Control (RRC) reconfiguration message including a Data Radio Bearer (DRB) configuration, the DRB configuration including a DRB identity and an Evolved Packet System (EPS) bearer identity; and processing circuitry configured to, in a case that the DRB identity is not part of a current configuration of the terminal apparatus, and an established DRB was configured for the EPS bearer identity before the terminal apparatus receives the RRC reconfiguration message, cause the terminal apparatus to perform processing to associate the established DRB with the EPS bearer identity, wherein the DRB configuration is configured by a New Radio (NR) RRC.

4. A communication method for a base station apparatus for communicating with a terminal apparatus, the communication method comprising:

transmitting, to the terminal apparatus, a Radio Resource Control (RRC) reconfiguration message including a Data Radio Bearer (DRB) configuration, the DRB configuration including a DRB identity and an Evolved Packet System (EPS) bearer identity; and causing the terminal apparatus to perform processing to associate an established DRB with the EPS bearer identity in a case that the DRB identity is not part of a current configuration of the terminal apparatus, and the established DRB was configured for the EPS bearer identity before the terminal apparatus receives the RRC reconfiguration message, wherein the DRB configuration is configured by a New Radio (NR) RRC.

* * * * *